(12) United States Patent
Parthasarathy et al.

(10) Patent No.: US 12,475,892 B2
(45) Date of Patent: Nov. 18, 2025

(54) TALKING SPEED ANALYSIS PER TOPIC SEGMENT IN A COMMUNICATION SESSION

(71) Applicant: Zoom Communications, Inc., San Jose, CA (US)

(72) Inventors: Vijay Parthasarathy, San Jose, CA (US); Xiaoli Song, Redding, CA (US); Yaling Song, Hangzhou (CN); Shaoyang Wu, Hangzhou (CN); Min Xiao-Devins, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 487 days.

(21) Appl. No.: 17/589,832

(22) Filed: Jan. 31, 2022

(65) Prior Publication Data

US 2023/0230596 A1    Jul. 20, 2023

(30) Foreign Application Priority Data

Jan. 20, 2022    (CN) .......................... 202220158736.1

(51) Int. Cl.
| | |
|---|---|
| *G10L 15/26* | (2006.01) |
| *G10L 15/06* | (2013.01) |
| *G10L 15/22* | (2006.01) |
| *H04L 12/18* | (2006.01) |

(52) U.S. Cl.
CPC ............ *G10L 15/26* (2013.01); *G10L 15/063* (2013.01); *G10L 15/22* (2013.01); *H04L 12/1822* (2013.01)

(58) Field of Classification Search
CPC ....... G10L 15/26; G10L 15/063; G10L 15/22; H04L 12/1822; H04L 12/1831
See application file for complete search history.

(56) References Cited

U.S. PATENT DOCUMENTS

| 11,315,569 | B1* | 4/2022 | Talieh ................. H04L 12/1831 |
| 2020/0279567 | A1* | 9/2020 | Adlersberg ............. G06F 40/35 |
| 2020/0403817 | A1* | 12/2020 | Daredia ................ G10L 15/083 |
| 2021/0375289 | A1* | 12/2021 | Zhu .......................... G10L 15/22 |
| 2022/0086393 | A1* | 3/2022 | Peters .................... H04N 7/147 |
| 2023/0013497 | A1* | 1/2023 | Aher ...................... G06F 3/165 |

* cited by examiner

*Primary Examiner* — Douglas Godbold
*Assistant Examiner* — Cameron Kenneth Young
(74) *Attorney, Agent, or Firm* — Young Basile Hanlon & MacFarlane, P.C.

(57) ABSTRACT

Methods and systems provide for presenting the results of talking speed analysis per topic segment in a communication session. The system connects to a communication session with a number of participants; receives a transcript of a conversation between the participants produced during the communication session, the transcript including timestamps for each utterance of a speaking participant; determines, based on analysis of the transcript, a meeting type for the communication session; generates, based on the meeting type, a number of topic segments for the conversation and respective timestamps for the topic segments; for each topic segment, determines a word count per unit of time for each speaking participant associated with a prespecified organization; and presents, to one or more client devices, data on the topic segments, each data including the word count per unit of time for each speaking participant within the topic segment.

20 Claims, 6 Drawing Sheets

FIG. 3

TALKING SPEED ANALYSIS PER TOPIC SEGMENT IN A COMMUNICATION SESSION

FIELD OF INVENTION

The present invention relates generally to digital communication, and more particularly, to systems and methods for presenting the results of talking speed analysis per topic segment in a communication session.

SUMMARY

The appended claims may serve as a summary of this application.

BRIEF DESCRIPTION OF THE DRAWINGS

The present invention relates generally to digital communication, and more particularly, to systems and methods providing for presenting the results of talking speed analysis per topic segment in a communication session.

The present disclosure will become better understood from the detailed description and the drawings, wherein:

FIG. 3 is a diagram illustrating one example embodiment of a user interface for presenting word count per minute of speakers for each topic segment.

DETAILED DESCRIPTION

Figure 1A:
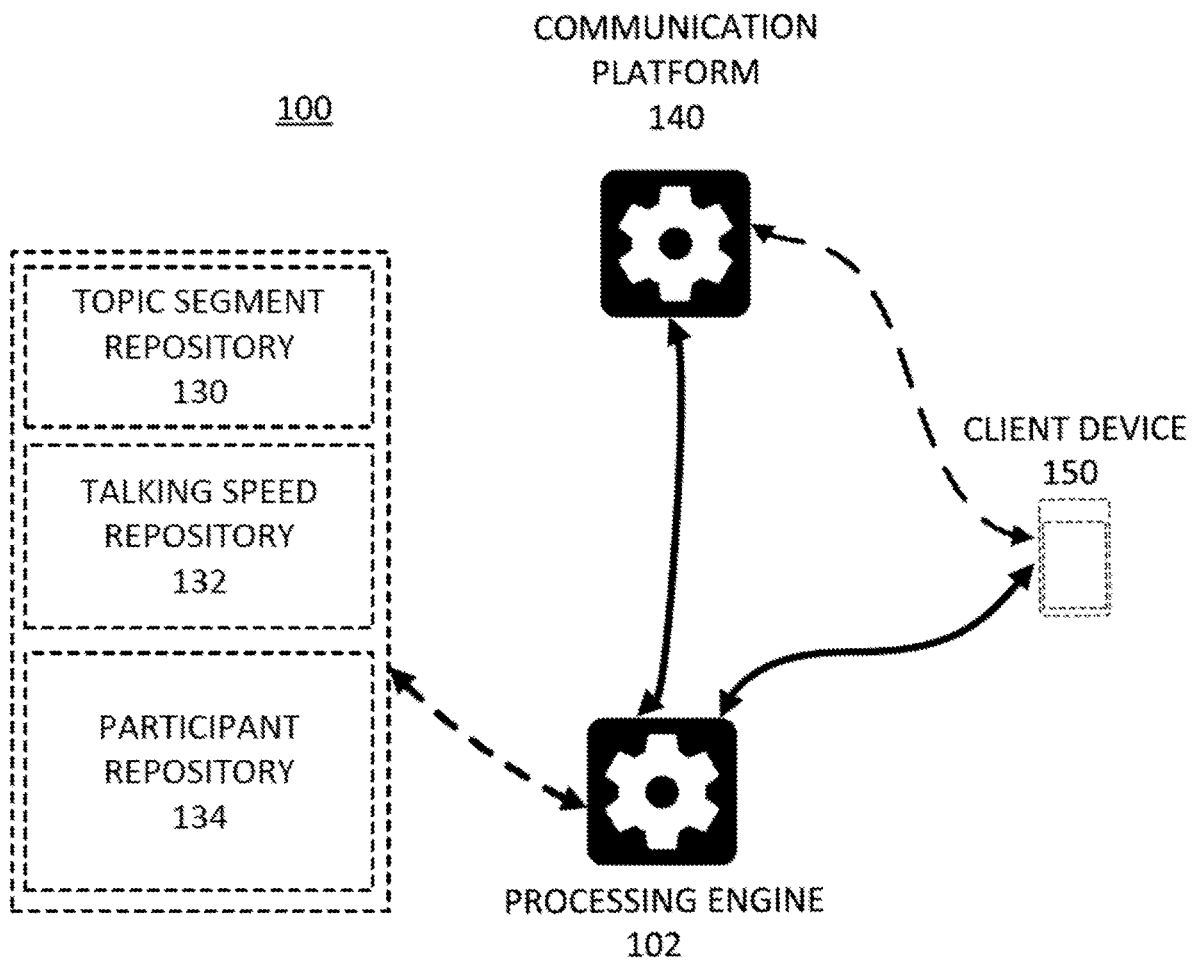
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the interne. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

One such use case which is currently lacking includes analytics data and metrics around talking speed, i.e., word count per unit of time, analysis for one or more speaking participants within a conversation in a communication session. Such a talking speed analysis can provide useful data for how fast a given sales representative is speaking during a sales meeting, for example, narrowed down per each topic within the sales meeting. It would be highly valuable for sales representatives within a sales team, for example, to learn about the speed of their talking depending on which topic is being discussed at a given time in a meeting.

Thus, there is a need in the field of digital communication tools and platforms to create a new and useful system and method for providing results of talking speed analysis per topic segment in a communication session. The source of the problem, as discovered by the inventors, is a lack of useful meeting intelligence and analytics data on a per-topic basis provided to members of an organization with respect to remote communication sessions.

In one embodiment, the system connects to a communication session with a number of participants; receives a transcript of a conversation between the participants produced during the communication session, the transcript including timestamps for each utterance of a speaking participant; determines, based on analysis of the transcript, a meeting type for the communication session; generates, based on the meeting type, a number of topic segments for the conversation and respective timestamps for the topic segments; for each topic segment, determines, based on analysis of the transcript and the timestamps for each utterance in the topic segment, a word count per unit of time for each speaking participant associated with a prespecified organization; and presents, to one or more client devices, data relating to the word count per unit of time for speaking participants within each topic segment and across all topic segments.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., a topic segment repository 130, talking speed repository 132, and/or a participant repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
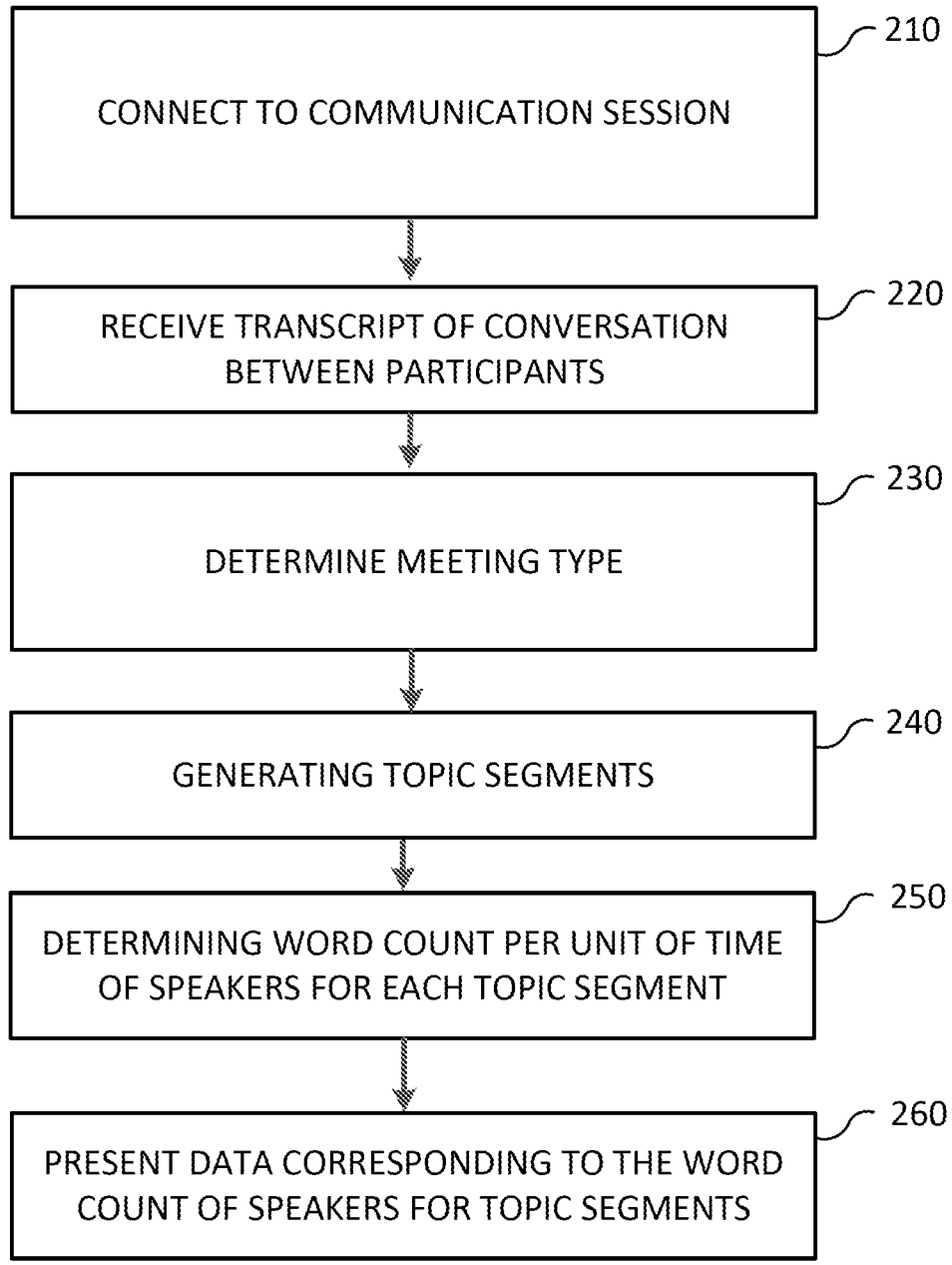
FIG. 2 is a flow chart illustrating an exemplary method that may be performed in some embodiments.

In an embodiment, the processing engine 102 may perform the exemplary method of FIG. 2 or other method herein and, as a result, present the results of talking speed analysis per topic segment in a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include a topic segment repository 130, talking speed repository 132, and/or participant repository 134. The optional repositories function to store and/or maintain, respectively, information on topic segments within the session; data on taking speed of participants; and information related to participants. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
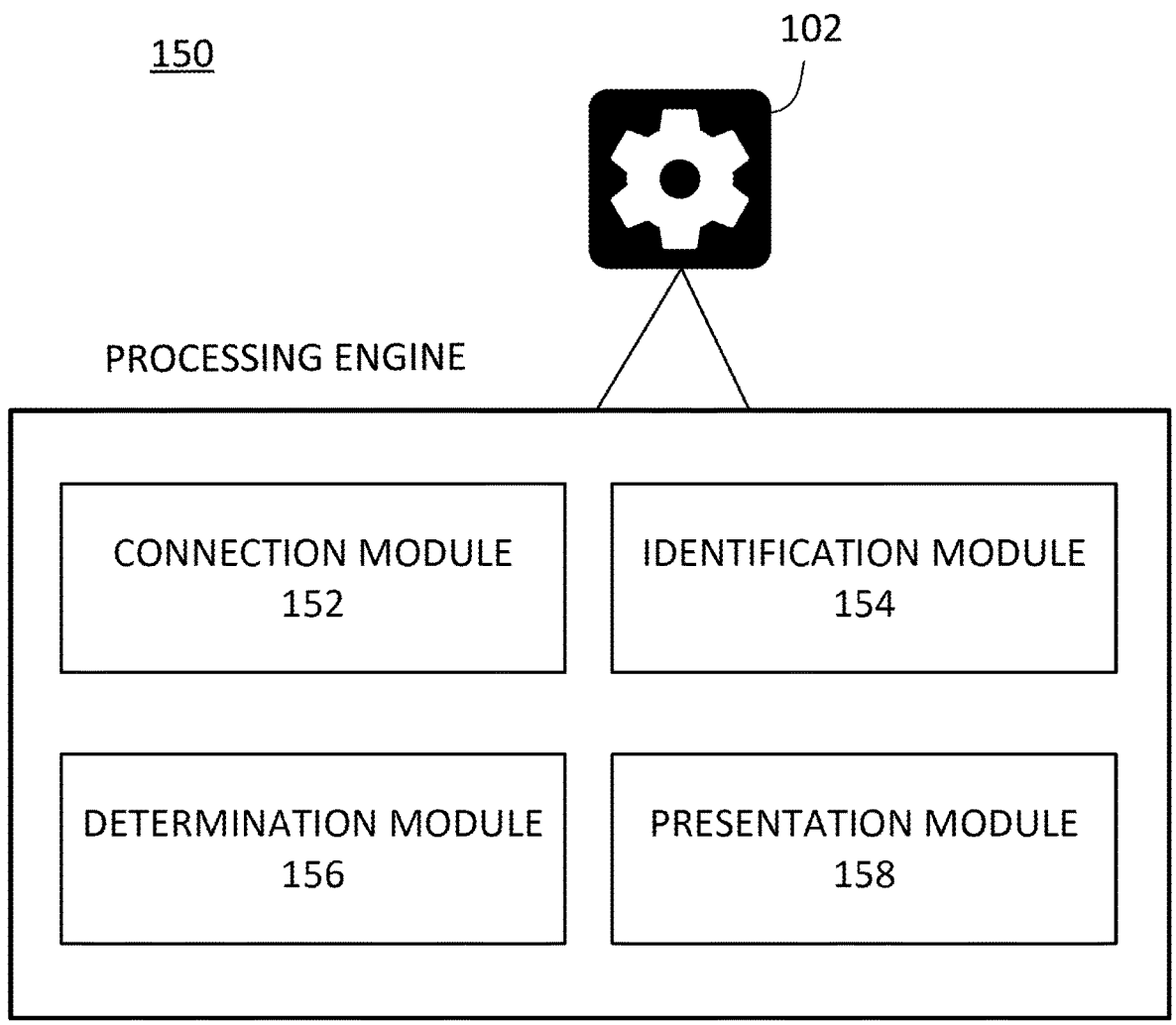
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connection module 152 functions to connect to a communication session with a number of participants, and receive or generate a transcript of a conversation between the participants produced during the communication session.

Identification module 154 functions to extract, from the transcript, a plurality of utterances each including one or more sentences spoken by the participants, and identify a subset of the utterances spoken by a subset of the participants associated with a prespecified organization.

Extraction module 156 functions to extract filler phrases within the subset of utterances.

Filler detection module 158 functions to apply filter detection rules to the subset of utterances to detect filler phrases and classify them into filler types from a predetermined list of filler types.

False positives module 160 functions to apply additional rules to detect and remove false positives from the detected filler phrases.

Presentation module 162 functions to present, for display on one or more client devices, data corresponding to the extracted filler phrases.

The above modules and their functions will be described in further detail in relation to an exemplary method below.

FIG. 2 is a flow chart illustrating an exemplary method that may be performed in some embodiments.

At step 210, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 220, the system receives a transcript of a conversation between the participants produced during the communication session. That is, the conversation which was produced during the communication is used to generate a transcript. The transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript in generated in real-time during the session and also presented in real-time during the session. In some embodiments, automatic speech recognition (ASR) techniques are used for generating the transcript.

At step 230, the system determines a meeting type for the communication session. This determination is made based on an analysis of the transcript. In some embodiments, the meeting type is determined from a predefined list of meeting types. For example, one meeting type may be a sales meeting, while another meeting type may be an internal department meeting. The meeting type is relevant because one's talking speed is capable of varying drastically depending on the type of meeting one is attending, both in terms of explaining and in terms of asking questions, among other aspects. Each meeting type follows a specific pattern, and correlates to a fixed set of topic segments. This reflects each meeting type including predictable topics which will always or nearly always be discussed. In some embodiments, the meeting type is further narrowed down per industry.

In some embodiments, the meeting type can be determined be a machine learning (ML) or other artificial intelligence (AI) model or models. Such a model can be trained to determine meeting types for communication sessions. In some embodiments, a pre-trained AI model is used.

At step 240, the system generates topic segments for the conversation, and respective timestamps for the time segments. This generation is performed based on the meeting type, since each meeting type has a fixed set of topic segments.

At step 250, the system determines word count scores per unit of time (e.g., per minute) for each speaking participant associated with a prespecified organization. That is, only speaking participants associated with, for example, the sales team in question will be analyzed in terms of their word count per unit of time score, since that is the performance metric that the client is interesting in having insight about. In some embodiments, the word count scores are determined based on timestamps within the transcript tied to each utterance. For example, a word count per minute for a participant can be calculated by the number of words in the transcript for that participant in one minute as determined by the timestamps, within that specific topic segment.

At step 260, the system presents, to one or more client devices, data on the topic segments, including the word count per unit of time for each speaking participant within the topic segment and across all topic segments. In various embodiments, this may be presented in individual form per topic segment, or aggregated form across all topic segments; as well as in individual form per participant, or aggregated form across all participants of a prespecified organization. In some embodiments, the talking speed of a presenter, or a number of presenters, is presented. In other embodiments, talking speed data for non-presenting participants may be presented. An example of a presentation is shown with respect to FIG. 2 below.

In some embodiments, the data is displayed at one or more client devices which are configured to display a UI related to the communication platform and/or communication session. In various embodiments, the one or more client devices may be, e.g., one or more desktop computers, smartphones, laptops, tablets, headsets or other wearable devices configured for virtual reality (VR), augmented reality (AR), or mixed reality, or any other suitable client device for displaying such a UI.

In various embodiments, the client devices may be associated with and/or operated by one or more of: one or more participants of the communication session associated with the organization, one or more administrators or hosts of the communication session, one or more users within an organizational reporting chain of participants of the communication session, and/or one or more authorized users within the organization. In some embodiments, users may be authorized for their client devices to receive a UI presenting data on extracted filler phrases if they are granted permission to access, view, and/or modify such data. In some embodiments, a UI for permissions control may be presented to one or more hosts, administrators, or authorized individuals which allows them to customize a number of settings for providing permissions to users with respect to such data. For example, a user authorized to manage permissions controls for a communication session, or all communication sessions for a particular organization, may be able to add participants, remove participants, add, remove, or modify the particular data or types of data which will be presented for such a session, and more.

Figure 3:
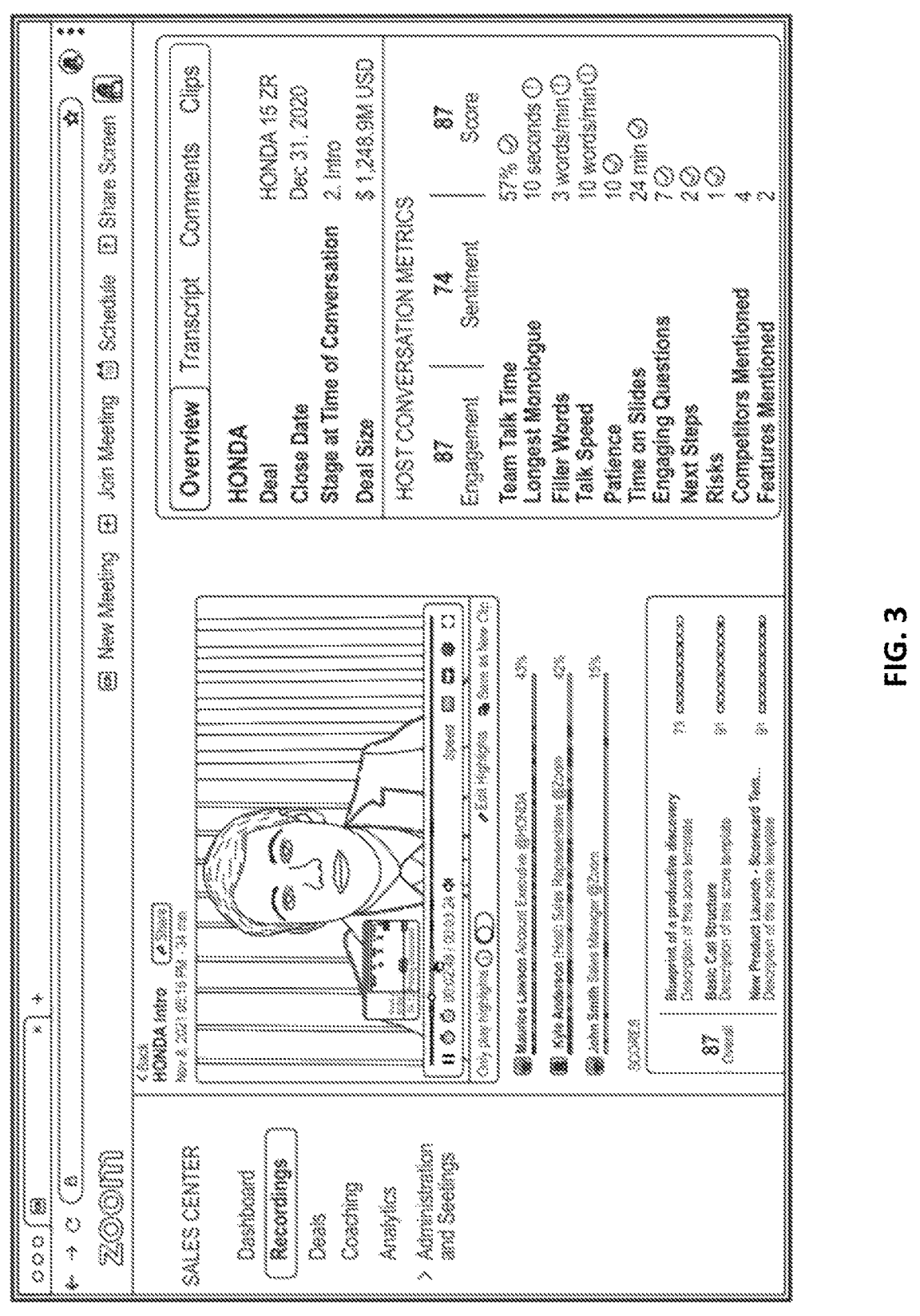

Within this displayed UI presented to the one or more client devices, data corresponding to the extracted filler phrases can be displayed. For example, a UI may be shown which displays aggregate analytics data pertaining to a sales team's meetings with clients over multiple conversations and communication sessions. Within this aggregate analytics data, average filler words used per minute across conversations can be displayed with respect to the entire team's performance. In some embodiments, data on average filler words used per minute during conversations is additionally or alternatively displayed for each individual member of a group. An example of such a UI displayed to client device(s) is illustrated in FIG. 3 and described in further detail below. In some embodiments, rather than aggregate analytics data or data shown for all team members, individual and/or customized analytics data for a particular participant can be viewed, including potentially a wide variety of data for that particular individual.

Figure 4:
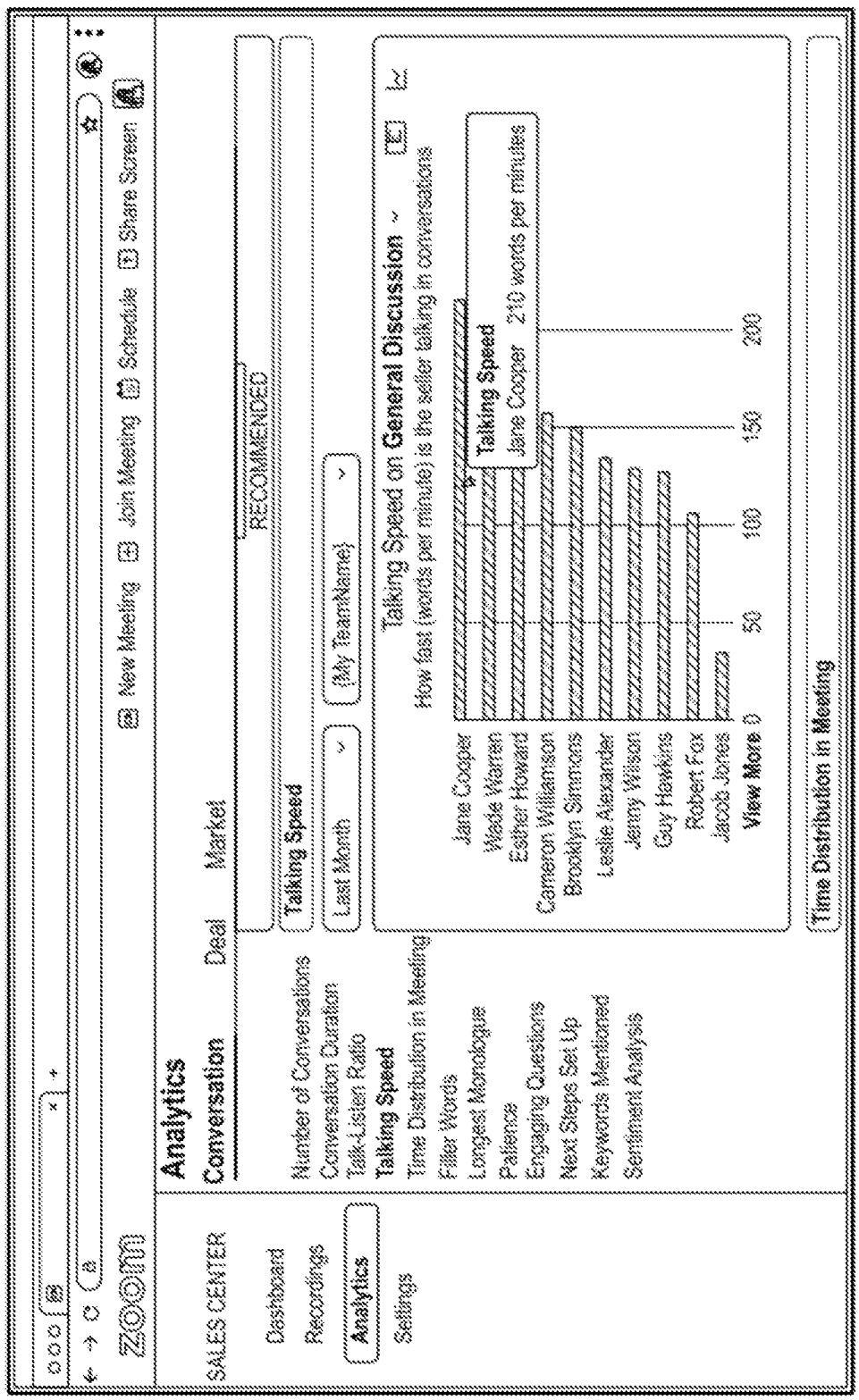
FIG. 4 is a diagram illustrating one example embodiment of a user interface for presenting data related to extracted filler phrases.

In some embodiments, the displayed UI may additionally or alternatively present one or more windows which present data with respect to an individual recording, such as the most recent conversation or a currently-in-progress conversation produced in a single given communication session. Users may be able to access a playback recording of the communication session, as well as see various pieces of data with respect to the communication session. In some embodiments, users may be able to view a transcript related to the conversation produced, and instruct the UI to display the detected filler words used within the transcript in a highlighted or similar fashion. An example of such a UI is illustrated in FIG. 4, described in further detail below. In some embodiments, a UI element with a playback recording may present one or more pieces of aggregate analytics data or individual analytics data corresponding to the communication session as a whole, the particular topic segment the user is playing back, or any other suitable data which can be presented. An example of such a UI element is illustrated in FIG. 6, described in further detail below.

FIG. 3 is a diagram illustrating one example embodiment of a user interface ("UI") for presenting data on the talking speed of a speaking participant per topic segment of a communication session.

Within the illustrated UI, a "Recordings" tab is presented at a display of a client device. Information about a specific recording of a communication session is displayed, including a video of the recording itself which can be played back in various ways or adjusted to skip to different times or topics within the video. A timeline allows the user to skip to different topic, and when the user hovers over a topic, a timestamp as well as a topic segment name is displayed.

On the right side of the window, a number of aggregate metrics for the entire sales team are displayed, including a "Talk Speed" metric for the entire team. Directly below the video playback UI element, a list of participants is shown for a particular topic segment, with data relating to each. This list of participants is ordered from highest talking time to lowest talking time, and a word count per minute ("Talk speed") is shown for each participant. The information presented for each participant, as well as the order of participants, changes based on the topic segment currently being played or currently skipped to.

FIG. 4 is a diagram illustrating one example embodiment of a user interface ("UI") for presenting analytics data related to talking speed analysis.

Within the illustrated UI, an analytics tab is presented at a display of a client device. A "Conversation" sub-tab is displayed with a number of analytics and metrics related to an aggregate of multiple conversations which participants have participated in within communication sessions for a sales team. One of the analytics elements which can be further navigated to is labeled "Talking Speed", which is currently selected for display within the UI window. This set of analytics data shown includes at least data, per participant associated with the organization, on talking speed within a particular topic segment (i.e., chapter) of the meeting. The topic segment for which the data in the example is shown is "General Discussion". A drop down menu element allows this topic segment to be changed to any topic segment within the meeting. In the example, Jane Cooper has a talking speed of 210 words per minute for this particular topic segment. On the low end, Jacob Jones has a talking speed of under 50 words per minute.

Additionally, filters appear above the data which allow for filtering conversations based on time and team. In this example, conversations from last month are included in the time filter, while the participant's team name is used for the team for which analytics data is displayed. Additional advanced filters may be applied via a drop down box UI element, if desired.

Figure 5:
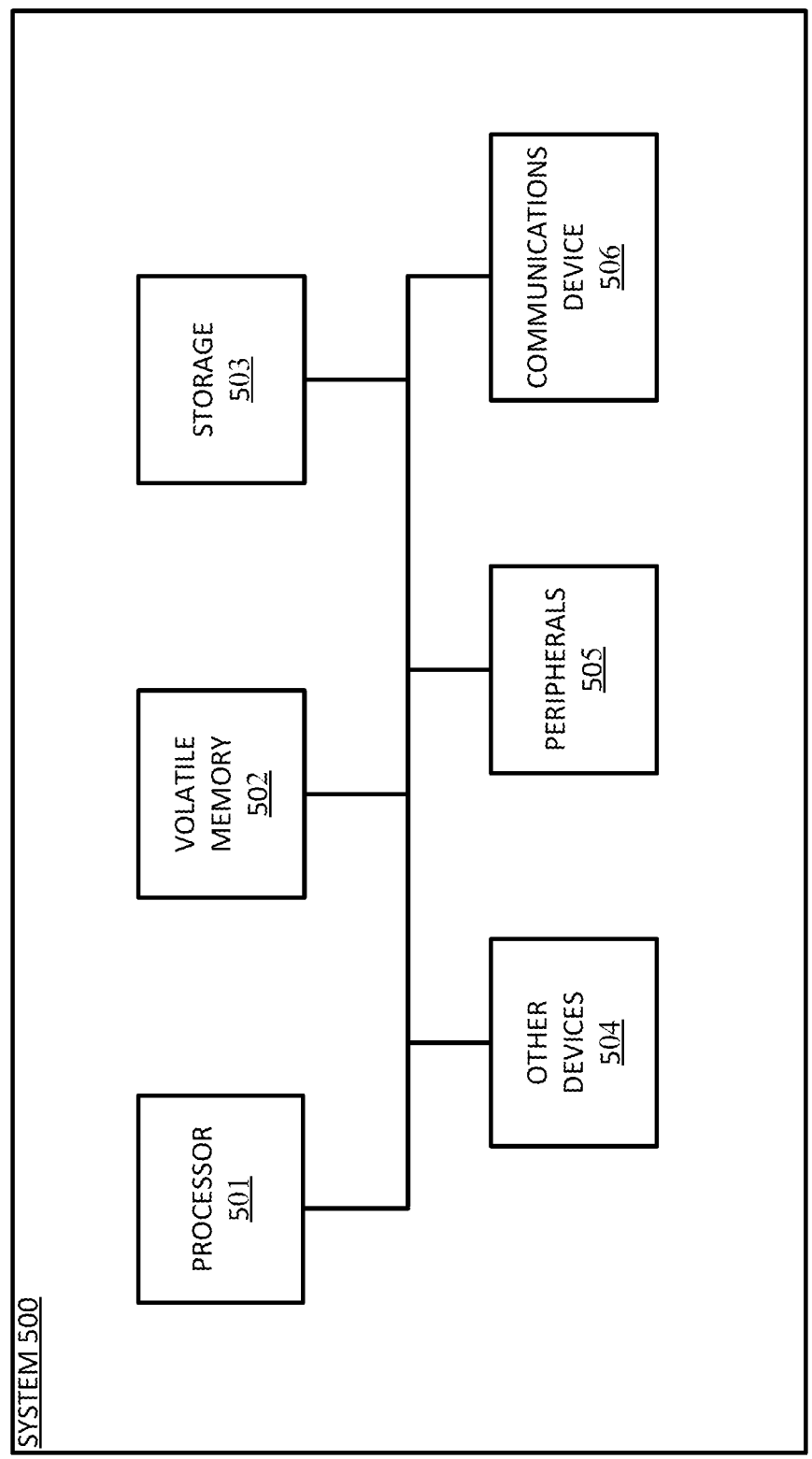
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

It will be appreciated that the present disclosure may include any one and up to all of the following examples.

Example 1. A method, comprising: connecting to a communication session with a plurality of participants; receiving a transcript of a conversation between the participants produced during the communication session, the transcript comprising timestamps for each utterance of a speaking participant; determining, based on analysis of the transcript, a meeting type for the communication session; generating, based on the meeting type, a plurality of topic segments for the conversation and respective timestamps for the topic segments; for each topic segment, determining, based on analysis of the transcript and the timestamps for each utterance in the topic segment, a word count per unit of time for each speaking participant associated with a prespecified organization; presenting, to one or more client devices, data relating to the word count per unit of time for speaking participants within each topic segment and across all topic segments.

Example 2. The method of example 1, further comprising: training one or more artificial intelligence (AI) models to determine meeting types for communication sessions, wherein determining the meeting type for the communication session is performed by the one or more AI models.

Example 3. The method of any of examples 1-2, wherein determining meeting types for communication sessions is performed by one or more pre-trained AI models.

Example 4. The method of any of examples 1-3, wherein the transcript of the conversation is generated via one or more automatic speech recognition (ASR) techniques.

Example 5. The method of any of examples 1-4, wherein: the communication session is a sales session with one or more prospective customers, the prespecified organization is a sales team, and the presented word counts for speaking participants relate to a performance metric for the sales team.

Example 6. The method of any of examples 1-5, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 7. The method of any of examples 1-6, wherein: the transcript is received or generated in real time while the communication session is underway, and one or more of the word counts of speaking participants are presented in real time to the one or more client devices while the communication session is underway.

Example 8. The method of any of examples 1-7, wherein each meeting type correlates to a fixed set of topic segments.

Example 9. The method of any of examples 1-8, wherein the unit of time is one minute.

Example 10. The method of any of examples 1-9, wherein the word count of participants per topic segment can be filtered based on one or more of: topic segment name, speaking participant name, and time within communication session.

Example 11. The method of any of examples 1-10, further comprising: training one or more artificial intelligence (AI) models to determine meeting types for communication sessions, wherein determining the meeting type for the communication session is performed by the one or more AI models.

Example 12. The method of any of examples 1-11, wherein determining meeting types for communication sessions is performed by one or more pre-trained AI models.

Example 13. The method of any of examples 1-12, wherein the transcript of the conversation is generated via one or more automatic speech recognition (ASR) techniques.

Example 14. The method of any of examples 1-13, wherein: the communication session is a sales session with one or more prospective customers, the prespecified organization is a sales team, and the presented word counts for speaking participants relate to a performance metric for the sales team.

Example 15. The method of any of examples 1-14, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 16. The method of any of examples 1-15, wherein: the transcript is received or generated in real time while the communication session is underway, and one or more of the word counts of speaking participants are presented in real time to the one or more client devices while the communication session is underway.

Example 17. The method of any of examples 1-16, wherein each meeting type correlates to a fixed set of topic segments.

Example 18. The method of any of examples 1-17, wherein the word count of participants per topic segment can be filtered based on one or more of: topic segment name, speaking participant name, and time within communication session.

Example 19. A communication system comprising one or more processors configured to perform the operations of: connecting to a communication session with a plurality of participants; receiving a transcript of a conversation between the participants produced during the communication session, the transcript comprising timestamps for each utterance of a speaking participant; determining, based on analysis of the transcript, a meeting type for the communication session; generating, based on the meeting type, a plurality of topic segments for the conversation and respective timestamps for the topic segments; for each topic segment, determining, based on analysis of the transcript and the timestamps for each utterance in the topic segment, a word count per unit of time for each speaking participant associated with a prespecified organization; presenting, to one or more client devices, data relating to the word count per unit of time for speaking participants within each topic segment and across all topic segments.

Example 20. The communication system of example 19, training one or more artificial intelligence (AI) models to determine meeting types for communication sessions, wherein determining the meeting type for the communication session is performed by the one or more AI models.

Example 21. The communication system of any of examples 19-20, wherein determining meeting types for communication sessions is performed by one or more pre-trained AI models.

Example 22. The communication system of any of examples 19-21, wherein the transcript of the conversation is generated via one or more automatic speech recognition (ASR) techniques.

Example 23. The communication system of any of examples 19-22, wherein: the communication session is a sales session with one or more prospective customers, the prespecified organization is a sales team, and the presented word counts for speaking participants relate to a performance metric for the sales team.

Example 24. The communication system of any of examples 19-23, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 25. The communication system of any of examples 19-24, wherein: the transcript is received or generated in real time while the communication session is underway, and one or more of the word counts of speaking participants are presented in real time to the one or more client devices while the communication session is underway.

Example 26. The communication system of any of examples 19-25, wherein each meeting type correlates to a fixed set of topic segments.

Example 27. The communication system of any of examples 19-26, wherein the word count of participants per topic segment can be filtered based on one or more of: topic segment name, speaking participant name, and time within communication session.

Example 28. The communication system of any of examples 19-27, further comprising: training one or more artificial intelligence (AI) models to determine meeting types for communication sessions, wherein determining the meeting type for the communication session is performed by the one or more AI models.

Example 29. The communication system of any of examples 19-28, wherein determining meeting types for communication sessions is performed by one or more pre-trained AI models.

Example 30. The communication system of any of examples 19-29, wherein the transcript of the conversation is generated via one or more automatic speech recognition (ASR) techniques.

Example 31. The communication system of any of examples 19-30, wherein: the communication session is a sales session with one or more prospective customers, the prespecified organization is a sales team, and the presented word counts for speaking participants relate to a performance metric for the sales team.

Example 32. The communication system of any of examples 19-31, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 33. The communication system of example 32, wherein: the transcript is received or generated in real time while the communication session is underway, and one or more of the word counts of speaking participants are presented in real time to the one or more client devices while the communication session is underway.

Example 34. The communication system of any of examples 19-33, wherein each meeting type correlates to a fixed set of topic segments.

Example 35. The communication system of any of examples 19-34, wherein the unit of time is one minute.

Example 36. The communication system of any of examples 19-35, wherein the word count of participants per topic segment can be filtered based on one or more of: topic segment name, speaking participant name, and time within communication session.

Example 37. A non-transitory computer-readable medium containing instructions for generating a note with session content from a communication session, comprising: instructions for connecting to a communication session with a plurality of participants; instructions for receiving a transcript of a conversation between the participants produced during the communication session, the transcript comprising timestamps for each utterance of a speaking participant; instructions for determining, based on analysis of the transcript, a meeting type for the communication session; instructions for generating, based on the meeting type, a plurality of topic segments for the conversation and respective timestamps for the topic segments; for each topic segment, instructions for determining, based on analysis of the transcript and the timestamps for each utterance in the topic segment, a word count per unit of time for each speaking participant associated with a prespecified organization; instructions for presenting, to one or more client devices, data relating to the word count per unit of time for speaking participants within each topic segment and across all topic segments.

Example 38. The non-transitory computer-readable medium of example 37, training one or more artificial intelligence (AI) models to determine meeting types for communication sessions, wherein determining the meeting type for the communication session is performed by the one or more AI models.

Example 39. The non-transitory computer-readable medium of any of examples 37-38, wherein determining meeting types for communication sessions is performed by one or more pre-trained AI models.

Example 40. The non-transitory computer-readable medium of any of examples 37-39, wherein the transcript of the conversation is generated via one or more automatic speech recognition (ASR) techniques.

Example 41. The non-transitory computer-readable medium of any of examples 37-40, wherein: the communication session is a sales session with one or more prospective customers, the prespecified organization is a sales team, and the presented word counts for speaking participants relate to a performance metric for the sales team.

Example 42. The non-transitory computer-readable medium of example 41, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 43. The non-transitory computer-readable medium of any of examples 41-42, wherein: the transcript is received or generated in real time while the communication session is underway, and one or more of the word counts of speaking participants are presented in real time to the one or more client devices while the communication session is underway.

Example 44. The non-transitory computer-readable medium of any of examples 37-43, wherein each meeting type correlates to a fixed set of topic segments.

Example 45. The non-transitory computer-readable medium of any of examples 37-44, wherein the unit of time is one minute.

Example 46. The non-transitory computer-readable medium of any of examples 37-45, wherein the word count of participants per topic segment can be filtered based on one or more of: topic segment name, speaking participant name, and time within communication session.

Example 47. The non-transitory computer-readable medium of any of examples 37-46, further comprising: training one or more artificial intelligence (AI) models to determine meeting types for communication sessions, wherein determining the meeting type for the communication session is performed by the one or more AI models.

Example 48. The non-transitory computer-readable medium of example 47, wherein determining meeting types for communication sessions is performed by one or more pre-trained AI models.

Example 49. The non-transitory computer-readable medium of any of examples 37-48, wherein the transcript of the conversation is generated via one or more automatic speech recognition (ASR) techniques.

Example 50. The non-transitory computer-readable medium of any of examples 37-49, wherein: the communication session is a sales session with one or more prospective customers, the prespecified organization is a sales team, and the presented word counts for speaking participants relate to a performance metric for the sales team.

Example 51. The non-transitory computer-readable medium of any of examples 37-50, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 52. The non-transitory computer-readable medium of any of examples 1-51, wherein: the transcript is received or generated in real time while the communication session is underway, and one or more of the word counts of speaking participants are presented in real time to the one or more client devices while the communication session is underway.

Example 53. The non-transitory computer-readable medium of any of examples 1-52, wherein each meeting type correlates to a fixed set of topic segments.

Example 54. The non-transitory computer-readable medium of any of examples 37-53, wherein the word count of participants per topic segment can be filtered based on one or more of: topic segment name, speaking participant name, and time within communication session.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
   connecting to a communication session with a plurality of participants;
   receiving a transcript of a conversation between the participants produced during the communication session, the transcript comprising timestamps for each utterance of a speaking participant;
   detecting one or more filler words in the transcript;
   determining that one or more of the filler words is a false positive filler word;
   removing the false positive filler word from the one or more filler words to obtain filtered filler words;
   classifying the filtered filler words into filler types from a predetermined list of filler types;
   highlighting the filtered filler words in the transcript;
   determining a talking speed of the speaking participant based on an analysis of the transcript;
   determining a meeting type for the communication session; based on the analysis of the transcript;
   generating, based on the meeting type, a plurality of topic segments for the conversation and respective timestamps for the topic segments;
   for each topic segment, determining, based on analysis of the transcript and the timestamps for each utterance in the topic segment, a word count per unit of time for each speaking participant associated with a prespecified organization; and presenting, to one or more client devices, data relating to the word count per unit of time for speaking participants (a) according to each topic segment of the communication session, (b) for all topic segments of the communication session, (c) according to each topic segment across multiple communication sessions, (d) for multiple topic segments of multiple communication sessions sharing the meeting type, and (e) aggregated across an entire team for each topic segment, across multiple topic segments of multiple communication sessions sharing the meeting type, and across multiple topic segments of multiple communication sessions having varying meeting types.

2. The method of claim 1, further comprising:
training one or more artificial intelligence (AI) models to determine meeting types for communication sessions, wherein determining the meeting type for the communication session is performed by the one or more AI models.

3. The method of claim 1, wherein determining meeting types for communication sessions is performed by one or more pre-trained AI models.

4. The method of claim 1, wherein the transcript of the conversation is generated via one or more automatic speech recognition (ASR) techniques.

5. The method of claim 1, wherein:
the communication session is a sales session with one or more prospective customers,
the prespecified organization is a sales team, and
the presented data relating to word counts for speaking participants corresponds to a performance metric for the sales team.

6. The method of claim 1, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

7. The method of claim 1, wherein:
the transcript is received or generated in real time while the communication session is underway, and
one or more of the word counts of speaking participants are presented in real time to the one or more client devices while the communication session is underway.

8. The method of claim 1, wherein each meeting type correlates to a fixed set of topic segments.

9. The method of claim 1, wherein the unit of time is one minute.

10. The method of claim 1, wherein the word count of participants per topic segment can be filtered based on one or more of: topic segment name, speaking participant name, and time within communication session.

11. A communication system comprising:
one or more processors configured to:
connect to a communication session with a plurality of participants;
receive a transcript of a conversation between the participants produced during the communication session, the transcript comprising timestamps for each utterance of a speaking participant;
detect one or more filler words in the transcript;
determine that one or more of the filler words is a false positive filler word;
remove the false positive filler word from the one or more filler words to obtain filtered filler words;
classify the filtered filler words into filler types from a predetermined list of filler types;
highlight the filtered filler words in the transcript;
determine a talking speed of the speaking participant based on an analysis of the transcript;
determine a meeting type for the communication session, based on the analysis of the transcript;
generate, based on the meeting type, a plurality of topic segments for the conversation and respective timestamps for the topic segments;
for each topic segment, determine, based on analysis of the transcript and the timestamps for each utterance in the topic segment, a word count per unit of time for each speaking participant associated with a prespecified organization; and
present, to one or more client devices, data relating to the word count per unit of time for speaking participants (a) according to each topic segment of the communication session, (b) for all topic segments of the communication session, (c) according to each topic segment across multiple communication sessions, (d) for multiple topic segments of multiple communication sessions sharing the meeting type, and (e) aggregated across an entire team for each topic segment, across multiple topic segments of multiple communication sessions sharing the meeting type, and across multiple topic segments of multiple communication sessions having varying meeting types.

12. The communication system of claim 11, wherein the one or more processors are further configured to:
train one or more artificial intelligence (AI) models to determine meeting types for communication sessions, wherein the meeting type for the communication session is determined by the one or more AI models.

13. The communication system of claim 11, wherein the meeting type for communication session is determined by one or more pre-trained AI models.

14. The communication system of claim 11, wherein the transcript of the conversation is generated via one or more automatic speech recognition (ASR) techniques.

15. The communication system of claim 11, wherein:
the communication session is a sales session with one or more prospective customers,
the prespecified organization is a sales team, and
the presented data relating to word counts for speaking participants corresponds to a performance metric for the sales team.

16. The communication system of claim 11, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

17. The communication system of claim 11, wherein:
the transcript is received or generated in real time while the communication session is underway, and
one or more of the word counts of speaking participants are presented in real time to the one or more client devices while the communication session is underway.

18. The communication system of claim 11, wherein each meeting type correlates to a fixed set of topic segments.

19. The communication system of claim 11, wherein the word count of participants per topic segment can be filtered based on one or more of: topic segment name, speaking participant name, and time within communication session.

20. A non-transitory computer-readable medium containing instructions, that when executed by one or more processors, causes the one or more processors to perform operations comprising:
 connecting to a communication session with a plurality of participants;
 receiving a transcript of a conversation between the participants produced during the communication session, the transcript comprising timestamps for each utterance of a speaking participant;
 detecting one or more filler words in the transcript;
 determining that one or more of the filler words is a false positive filler word;
 removing the false positive filler word from the one or more filler words to obtain filtered filler words;
 classifying the filtered filler words into filler types from a predetermined list of filler types;
 highlighting the filtered filler words in the transcript;
 determining a talking speed of the speaking participant based on an analysis of the transcript;
 determining a meeting type for the communication session based on the analysis of the transcript;
 generating, based on the meeting type, a plurality of topic segments for the conversation and respective timestamps for the topic segments;
 for each topic segment, determining, based on analysis of the transcript and the timestamps for each utterance in the topic segment, a word count per unit of time for each speaking participant associated with a prespecified organization; and
 presenting, to one or more client devices, data relating to the word count per unit of time for speaking participants (a) according to each topic segment of the communication session, (b) across all topic segments of the communication session, (c) according to each topic segment across multiple communication sessions, (d) for multiple topic segments of multiple communication sessions sharing the meeting type, and (e) aggregated across an entire team for each topic segment, across multiple topic segments of multiple communication sessions sharing the meeting type, and across multiple topic segments of multiple communication sessions having varying meeting types.

* * * * *